United States Patent Office

2,762,855
Patented Sept. 11, 1956

2,762,855

PROCESS OF MAKING AGGLOMERATES FOR RUBBER COMPOUNDING AND PRODUCT THEREOF

Kenneth E. Creed, Jr., Nitro, W. Va., assignor to Monsanto Chemical Company, St. Louis, Mo., a corporation of Delaware No Drawing. Application December 3, 1952,
Serial No. 323,919

4 Claims. (Cl. 260—785)

This invention relates to improved dust-free compositions and methods of making same. More particularly it relates to a method of producing free-flowing dustless bead-like agglomerates for rubber compounding.

In order to reduce the dustiness of rubber compounding agents, as for example accelerators of vulcanization, it has been proposed to treat them with additives such as mineral oils, vegetable oils, salts of fatty acids, and similar materials or to compress them into pills and other forms. However, none of these compositions are entirely satisfactory. Either they possess varying amounts of finely divided particles such that when the compositions are shaken or poured from a container some of the fines float in the air as dust or they are so dense and hard that they fail to disintegrate and disperse on admixing into the rubber.

In my Patent No. 2,598,229 granted May 27, 1952, is described a method of producing dust-free agglomerates by heating an aqueous slurry of 2,2'-dithiobis benzothiazole in the presence of a waxy material. In accordance with the present invention and accelerator composition in particulate form is produced by heating an aqueous slurry of 2,2'-dithiobis benzothiazole without a waxy binder. The temperature of heating may vary considerably although the agglomeration takes place more rapidly at higher temperatures. For example heating in a range of 85° C. to refluxing temperature of the aqueous slurry permits agglomeration within a relatively short time. Hard agglomerates are produced which have very desirable storage and packaging characteristics and freedom from dust but which nevertheless are friable and disperse satisfactorily into rubber. When the particles have grown to the desired size the reaction is terminated by cooling. The agglomerating process may be terminated quickly by quenching with cold water. If the heating and stirring are prolonged unduly, the particles may grow to an undesirably large size. The process can be carried out in either acid or alkaline medium although the reaction is somewhat faster at a pH of 7 or below.

2,2'-dithiobis benzothiazole is usually made commercially by oxidation of mercaptobenzothiazole. A common expedient is to add an oxidizing agent to an aqueous solution of sodium mercaptobenzothiazole. It is unnecessary to isolate the product from the reaction mixture prior to converting it to a particulate aggregation. On the contrary the by-product materials normally present in the slurry are important adjuvants for the formation of bead-like particles. The presence of by-product salt, unreacted mercaptobenzothiazole, benzothiazole, sulfur, thiosulfate, sulfite and by-product tars inherently present are all beneficial. Where desired one or more of these ingredients may be added to supplement or replace the quantity normally present in the reaction mixture.

The following examples illustrate in detail the preparation of bead-like particles essentially dust-free.

EXAMPLE 1

2,2'-dithiobis benzothiazole was prepared by oxidizing mercaptobenzothiazole by the method of U. S. Patent 2,265,347 to Carr. While vigorously agitating, chlorine gas was introduced into the space above a solution of approximately 9% sodium mercaptobenzothiazole. As the chlorine was absorbed the disulfide rapidly precipitated as fine particles. At the completion of the oxidation, without isolating the product, 872 parts by weight of the slurry containing approximately 80.6 parts by weight of 2,2'-dithiobis benzothiazole was charged into a suitable container. The pH of the slurry was 8.2. The slurry was heated at about 100° C. for 2½ hours and then cooled quickly by the addition of a large excess of cold water. Substantially all of the 2,2'-dithiobis benzothiazole was transformed into bead-like pellets of which 18.6% were larger than 8-mesh, 81.0% were smaller than 8-mesh but larger than 20-mesh and 0.4% were smaller than 20-mesh but larger than 40-mesh. The screen analysis refers to U. S. standard mesh sizes. The agglomeration is accompanied by the formation of some mercaptobenzothiazole in addition to that initially present in the slurry. For example the reaction mixture at the end of the oxidation contained by analysis 1.68% mercaptobenzothiazole and after agglomeration the bead-like particles contained by analysis 7.82% mercaptobenzothiazole.

EXAMPLE 2

A portion of the aqueous reaction mixture containing 2,2'-dithiobis benzothiazole described in the foregoing example was acidified to a pH of 3. 873,5 parts by weight of the dispersion containing 80.6 parts by weight of 2,2'-dithiobis benzothiazole was heated and stirred at 100° C. The agglomeration was more rapid than in the preceding example. Heating and stirring for 2½ hours resulted in agglomerates ranging in size from ½" diameter to particles comparable to grains of sand. The yield was essentially quantitative.

EXAMPLE 3

4,000 ml. of an aqueous slurry of 2,2'-dithiobis benzothiazole, pH 8.4, prepared as described in Example 1, was charged into a suitable container. The slurry contained 10.5 parts by weight of 2,2'-dithiobis benzothiazole per 100 ml. and 0.378 part by weight of sodium thiosulfate per 100 ml. This was supplemented by the further addition of 5.8 parts by weight of sodium thiosulfate. Additionally 4.0 parts by weight of a 30% solution of sodium dodecyl benzene sulfonate was added. The pH was adjusted to 3.5 by the addition of 115 ml. of normal hydrochloric acid. The dispersion was then stirred at 500–600 R. P. M. for about 45 minutes while heating to 97° C. Stirring and heating was continued for 2¼ hours at 97–100° C. and the reaction terminated by adding 3500 ml. of cold water to the hot mixture. The agglomerates were then removed by filtration and dried at 50° C. in an oven. Essentially a quantitative yield of dustless bead-like agglomerates were obtained, none of which were retained on a 10-mesh screen. 1.5% were retained on a 40-mesh screen and 93.4% were smaller than 40-mesh but retained on a 100-mesh screen. 5.1% were smaller than 100-mesh. Analysis of the particles gave 0.4% ash, 73.8% 2,2'-dithiobis benzothiazole and 12.3% mercaptobenzothiazole.

EXAMPLE 4

An aqueous slurry of 2,2'-dithiobis benzothiazole prepared as described in Example 1 contained 9.52 parts by weight per 100 ml. and 0.51 part by weight of sodium thiosulfate per 100 ml. To 732 ml. of the dispersion so prepared was added 2.3 parts by weight of sodium thiosulfate. The pH was adjusted to 3.5 by the addition of 10 ml. of normal hydrochloric acid. Over a period of about half an hour the mixture was heated to 97° C. while stirring. Heating was continued for 1½ hours at 97° C. and the reaction terminated by the addition of 150 ml. of cold water. The mixture was further cooled by means of an ice bath. The particles were removed by filtration, washed with 500 ml. of water and dried at 50° C. Substantially a quantitative yield of bead-like agglomerates was obtained. Screen analysis gave 0.5% retained on a 10-mesh screen, 97.5% smaller than 10-mesh but retained on a 40-mesh screen and approximately 2% smaller than 40-mesh. The particles contained 0.32% ash, 72.9% 2,2'-dithiobis benzothiazole and 10.8% mercaptobenzothiazole.

EXAMPLE 5

An aqueous slurry of 2,2'-dithiobis benzothiazole was filtered and the solids washed thoroughly with water and to the wet filter cake containing 100 parts wet 2,2'-dithiobis benzothiazole on a dry basis dispersed in 800 parts by weight of water there was added 50 parts by weight of sodium chloride and 5.6 parts by weight of by-product tars obtained in the manufacture of mercaptobenzothiazole by the process of Kelly Patent 1,631,871. The dispersion so produced had a pH of 4. The mixture was heated and stirred for about 2 hours at 97–98° C. at which time a substantial portion of agglomerates about ¼" diameter had formed. Heating and stirring was continued for a total of 7 hours and the product then filtered. Substantially a theoretical yield of agglomerated product was obtained. 97.1% thereof was retained on a 40-mesh screen.

The preparation of 2,2'-dithiobis benzothiazole by the method described in Example 1 normally results in the formation of an appreciable quantity of sodium thiosulfate. This, however, is subject to wide variation. For example in one series of analyses the sodium thiosulfate content varied from 0.17% to 5.02% based on the 2,2'-dithiobis benzothiazole. The average was 2.3%. The sodium sulfite varied from 0.22% to 2.44%, the average being 1.44%. These analyses were carried out by titration with iodine. Since both sulfite and thiosulfate react with iodine, the sulfite was eliminated by the addition of formaldehyde to form the addition compound and a second titration carried out, the sulfite then being determined by difference. Obviously the method does not distinguish between thiosulfate and any other by-products besides sulfite which might be present that would reduce iodine. Experiments carried out with pure 2,2'-dithiobis benzothiazole in pure water showed that sodium thiosulfate definitely decreased the time required for agglomeration. The optimum is about 5% based on the 2,2'-dithiobis benzothiazole. For example about 7½ hours was required for agglomeration of a dispersion containing 0.17% sodium thiosulfate. The time was reduced to 4½–5½ hours by increasing the sodium thiosulfate to 1–2% and increasing it to 3–5% decreased the time to 1¾–4½ hours. Having more than about 5% sodium thiosulfate present, however, was no apparent advantage. Similarly sodium sulfite exerts a beneficial effect although higher quantities are required. The presence of 4% sodium sulfite on the 2,2'-dithiobis benzothiazole permitted agglomeration in 1¾ hours and increasing the quantity to about 6% permitted agglomeration in less than an hour. There was no apparent advantage in the presence of more than about 6% sodium sulfite. The presence of free sulfur is also beneficial or sulfur in combination with other ingredients as for example sodium sulfite. In a dispersion containing 5.8% sodium thiosulfate the addition of 0.8% sulfur based on the 2,2'-dithiobis benzothiazole reduced the time required for agglomeration by 18 minutes. The addition of 3.3% sulfur reduced the time required for agglomeration by 30 minutes. Although sodium chloride has a salutary effect, quantities in excess of those normally present as by-product salt have no additional benefit.

Where desired the agglomeration can be carried out by heating and then gradually cooling but it is preferable to continue heating until the agglomerates reach the desired size and then terminate the reaction quickly by sudden cooling. The process has been successfully carried out in an autoclave at 100–112° C. While the time cycle was still further reduced by the higher temperature, the advantages are generally insufficient to overcome the convenience of operation at atmospheric pressure. Foaming during the heating may be controlled by the addition of a surface active agent as for example 0.1% of sodium dodecyl benzene sulfonate based upon the total weight of the dispersion. These agents also serve as dispersing agents. Sulfonated castor oil may be similarly employed.

As is evident from the foregoing the process may be controlled so as to produce particles of almost any size desired. By terminating the reaction at the proper time substantially quantitative yields of agglomerated products have been obtained, 80–95% of which are smaller than 40-mesh but retained on a 100-mesh screen. Particles of a size between 60 and 80-mesh appear to be particularly desirable for some purposes and the process has been successfully controlled to give particles of this size range. In general essentially quantitative yields of substantially dust-free product can be obtained containing no particles larger than 10-mesh. Although the agglomerates usually have to the naked eye the appearance of uniform size and shape, they are actually somewhat irregular and variable in shape and are further characterized by a range of sizes. They may be essentially spherical and generally give this impression. However, close examination reveals a popcorn appearance, probably the result of a combination of several particles.

The agglomerated particles are readily dispersible into a rubber stock. Furthermore, the physical properties of the vulcanizates and the vulcanization rate are indistinguishable from compositions containing 2,2'-dithiobis benzothiazole in the usual fine particle form. This is noteworthy in view of the fact that a chemical change apparently takes place during the heating. Analyses of the agglomerates by solvent extraction methods gave values ranging from 68.5 to 80.8% 2,2'-dithiobis benzothiazole, the average being 76.2%. The mercaptobenzothiazole content averaged 11.5%. Although no methods of analysis are available which are entirely satisfactory, the fact that the sum of these two constituents is less than 100% indicates that other constituents are present although their identity is unknown.

To illustrate the ease with which the agglomerates disperse into rubber, 33⅓% master batches were prepared on an open faced mill at a roll temperature of 65–70° C. The dispersion time and ease of dispersion were noted employing a commercial sample of finely powdered 2,2'-dithiobis benzothiazole and the product of Example 3. The observations are recorded below:

*Table 1*

| Accelerator | Dispersion Time | Remarks |
|---|---|---|
| Commercial powdered 2,2'-dithiobis benzothiazole. | 2' 50" | Caked badly; considerable fall through and static. |
| Product of Example 3 | 1' 30" | No caking, fall through or static. |

In other tests 20% master batches were prepared in a Banbury mixer. Samples of the rubber mixes were removed after 15, 30, 45, 60 and 120 second intervals and 1% benzene cements prepared. Light transmission data were obtained with a Porter-Fischer electrophotometer. A high percent light transmission is indicative of a well dispersed accelerator.

Table II

| Accelerator | Percent Light Transmission after milling | | | | |
|---|---|---|---|---|---|
| | 15 sec. | 30 sec. | 45 sec. | 60 sec. | 120 sec. |
| Commercial sample of powdered 2,2'-dithiobis benzothiazole | 81.5 | 82 | 68.5 | 69 | 67.5 |
| Product of Example 3 | 89.5 | 86.5 | 90 | 90 | 89 |

Vulcanizable rubber compositions were compounded comprising:

| Stock | A | B | C | D |
|---|---|---|---|---|
| Smoked sheets rubber parts by weight | 100 | 100 | 100 | 100 |
| Zinc oxide do | 5 | 5 | 5 | 5 |
| Stearic acid do | 1 | 1 | 1 | 1 |
| Sulfur do | 3 | 3 | 3 | 3 |
| Commercial powdered 2,2'-dithiobis benzothiazole A [1] parts by weight | 1 | | | |
| Commercial powdered 2,2'-dithiobis benzothiazole B [1] parts by weight | | 1 | | |
| Product of Example 3 do | | | 1 | |
| Product of Example 4 do | | | | 1 |

[1] These were commercial samples from different manufacturers of powdered 2,2'-dithiobis benzothiazole treated to reduce the dusting.

The compositions were vulcanized in the usual manner by heating for 60 minutes in a press at 135° C. The physical properties of the vulcanizates are set forth below:

Table III

| Stock | Modulus of Elasticity in lbs./in.$^2$ at Elongations of— | | Tensile at Break in lbs./in.$^2$ | Ultimate Elongation, percent |
|---|---|---|---|---|
| | 500% | 700% | | |
| A | 545 | 1,760 | 3,400 | 840 |
| B | 563 | 1,866 | 2,986 | 790 |
| C | 580 | 1,825 | 3,085 | 790 |
| D | 510 | 1,800 | 3,590 | 815 |

The scorch resistance of Stocks A and D was evaluated by means of a Mooney plastometer. The scorch point was taken as the minutes heating at 135° C. required for the plasticity curve to rise sharply.

Table IV

| Stock | Scorch Time in Mins. |
|---|---|
| A | 11 |
| D | 11 |

Other tests were carried out in a carbonate loaded white stock comprising:

| Stock | E | F |
|---|---|---|
| Smoked sheets rubber parts by weight | 100 | 100 |
| Zinc oxide do | 5 | 5 |
| Stearic acid do | 0.5 | 0.5 |
| Sulfur do | 2 | 2 |
| Whiting do | 30 | 30 |
| Commercial powdered 2,2'-dithiobis benzothiazole A parts by weight | 1 | |
| Product of Example 4 do | | 1 |

The stocks so compounded were vulcanized by heating in the usual manner in a press for 60 minutes at 142° C. The physical properties of the vulcanizates are set forth below:

Table V

| Stock | Modulus of Elasticity in lbs./in.$^2$ at Elongations of— | | Tensile at Break in lbs./in.$^2$ | Ultimate Elongation, percent |
|---|---|---|---|---|
| | 500% | 700% | | |
| E | 446 | 1,346 | 2,820 | 870 |
| F | 420 | 1,313 | 2,840 | 880 |

It is evident from the foregoing that the accelerating characteristics of the agglomerated form are equivalent to commercial samples of powdered 2,2'-dithiobis benzothiazole.

It is intended to cover all changes and modifications of the examples of the invention herein chosen for purposes of disclosure which do not constitute departures from the spirit and scope of the invention.

What is claimed is:

1. The process of making an improved dustless free-flowing 2,2'-dithiobis benzothiazole composition for rubber compounding from an aqueous dispersion of 2,2'-dithiobis benzothiazole prepared by oxidizing mercaptobenzothiazole in aqueous medium, which consists in stirring and heating an aqueous dispersion of 2,2'-dithiobis benzothiazole at about 85° C. to refluxing temperature in the presence of by-products accompanying its formation until bead-like agglomerates larger than 100-mesh are formed.

2. The process of making an improved dustless free-flowing 2,2'-dithiobis benzothiazole composition for rubber compounding from an aqueous dispersion of 2,2'-dithiobis benzothiazole prepared by oxidizing with chlorine sodium mercaptobenzothiazole in aqueous solution which consists in, adjusting the pH of the dispersion at least as low as 7, stirring and heating at a temperature in the range of 83° C. to refluxing temperature in the presence of by-products accompanying the formation of 2,2'-dithiobis benzothiazole until bead-like agglomerates larger than 80-mesh are formed.

3. The process of making an improved dustless free-flowing 2,2'-dithiobis benzothiazole composition for rubber compounding which consists in stirring and heating within the range of about 85° C. to refluxing temperature an aqueous suspension of 2,2'-dithiobis benzothiazole in the presence of a salt which forms as a by-product upon oxidizing mercaptobenzothiazole with chlorine selected from the group consisting of sodium chloride, sodium thiosulfate and sodium sulfite.

4. An improved dustless free-flowing 2,2'-dithiobis benzothiazole composition for rubber compounding containing no waxy material but consisting essentially of hard bead-like agglomerates larger than 100-mesh in size consisting in a mixture approximately three-fourths of which is 2,2'-dithiobis benzothiazole and the remainder is thermal decomposition products thereof including mercaptobenzothiazole, the agglomerates being irregular and variable in size and shape and characterized by disintegrating and dispersing on milling into rubber said agglomerates being produced by the process of claim 2.

References Cited in the file of this patent

UNITED STATES PATENTS

| | | |
|---|---|---|
| 2,265,347 | Carr | Dec. 9, 1941 |
| 2,349,599 | Moorhouse | May 23, 1944 |
| 2,475,582 | Chao | July 12, 1949 |
| 2,598,229 | Creed | May 27, 1952 |